United States Patent
Childs

(10) Patent No.: US 9,654,007 B1
(45) Date of Patent: May 16, 2017

(54) REGULATION OF A MULTIPLE STAGE SWITCH MODE POWER CONVERTER THROUGH AN INTERMEDIATE VOLTAGE CONTROL

(71) Applicant: Dialog Semiconductor (UK) Limited, London (GB)

(72) Inventor: Mark Childs, Swindon (GB)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 15/214,821

(22) Filed: Jul. 20, 2016

(30) Foreign Application Priority Data

Jun. 22, 2016 (DE) .......... 10 2016 211 163

(51) Int. Cl.
| | | |
|---|---|---|
| *H02M 3/158* | (2006.01) | |
| *H02M 1/08* | (2006.01) | |
| *H02M 1/00* | (2006.01) | |

(52) U.S. Cl.
CPC ........... *H02M 3/1582* (2013.01); *H02M 1/08* (2013.01); *H02M 2001/0009* (2013.01)

(58) Field of Classification Search
CPC .................. H02M 3/1582; H02M 1/08; H02M 2001/0009
See application file for complete search history.

(56) References Cited

U.S. PATENT DOCUMENTS

| | | | |
|---|---|---|---|
| 6,650,556 B2 | 11/2003 | Dinh et al. | |
| 7,161,335 B2 * | 1/2007 | Wei | H02M 3/156 323/266 |
| 7,183,724 B2 | 2/2007 | Ball | |
| 7,570,036 B2 * | 8/2009 | Tang | H02M 3/1584 323/272 |
| 7,872,886 B2 * | 1/2011 | Xu | H02M 3/1584 307/77 |
| 8,417,980 B1 | 4/2013 | Mimberg | |
| 8,493,039 B2 | 7/2013 | Guo | |

(Continued)

OTHER PUBLICATIONS

Co-pending, U.S. Appl. No. 15/278,492, filed Sep. 28, 2016, "An Asymmetric Two-Stage DC-DC Switching Converter," by Mark Childs, 38 pgs.

(Continued)

*Primary Examiner* — Jue Zhang
(74) *Attorney, Agent, or Firm* — Saile Ackerman LLC; Stephen B. Ackerman; Billy Knowles

(57) ABSTRACT

A multiple phase, multiple stage SMPC system includes at least one single stage phase SMPC circuit that converts an input voltage to an output voltage applied to an electronic load circuit and at least one multiple stage phase SMPC circuit. The at least one multiple stage phase SMPC circuit has at least one primary stage phase SMPC circuit generates, monitors, and controls an intermediate voltage and at least one secondary stage phase SMPC circuit converts the intermediate voltage to the output voltage. The at least one secondary stage phase has a voltage conditioner that transforms the intermediate voltage to a reference voltage that is approximately the level of the output voltage. The at least one primary stage phase SMPC circuit monitors and controls the intermediate voltage to force the at least one secondary stage phase to make its output current a correct portion of the total load current.

51 Claims, 8 Drawing Sheets

(56) References Cited

U.S. PATENT DOCUMENTS

| | | | |
|---|---|---|---|
| 8,772,967 B1 | 7/2014 | Ikriannikov et al. | |
| 2003/0218893 A1* | 11/2003 | Tai | H02M 3/1584 363/65 |
| 2007/0086224 A1* | 4/2007 | Phadke | H02M 3/285 363/65 |
| 2015/0097542 A1 | 4/2015 | Repton et al. | |
| 2015/0303802 A1* | 10/2015 | Childs | H02M 3/158 323/271 |
| 2016/0365791 A1* | 12/2016 | Childs | H02M 1/08 |

OTHER PUBLICATIONS

Co-pending, U.S. Appl. No. 15/263,732, filed Sep. 13, 2016, "Multiphase DCDC Converter wtih Asymmetric GM," by Mark Childs, 26 pgs.

Co-pending U.S. Appl. No. 15/189,210, filed Jun. 22, 2016, "Hybrid Buck," by Mark Childs, 24 pgs.

"Asymmetrical Interleaved DC/DC Switching Converters for Photovoltaic and Fuel Cell Applicaitons—Part 1: Circuit Generation, Analysis and Design," by Eliana Arango et al., Energies ISSN 1996-1073, Nov. 14, 2012, found: www.mdpi.com/journal/energies, pp. 4590-4623.

"Two-Stage Power Conversion Architecture Suitable for Wide Range Input Voltage," by Seungbum Lim et al, IEEE Transactions on Power Electronics, Mar. 4, 2014, pp. 1-12.

"Feed-Forward based Control in a DC-DC Converter of Asymmetric Multistage Stacked Boost Architecture," by Georgios Mademlis et al., Mar. 16, 2016, pp. 1-10.

"A Multistage Interleaved Synchronous Buck Converter With Integrated Output Filter in 0.18 μm SiGe Process," by Siamak Abedinpour et al, IEEE Transactions on Power Electronics, vol. 22, No. 6, Nov. 2007, pp. 2164-2175.

German Office Action, File Number: 10 2016 211 163.9, Applicant: Dialog Semiconductor (UK) Limited, Mail date: Feb. 1, 2017, 10 pgs, and English language translation, 11 pgs.

\* cited by examiner

REGULATION OF A MULTIPLE STAGE SWITCH MODE POWER CONVERTER THROUGH AN INTERMEDIATE VOLTAGE CONTROL

RELATED PATENT APPLICATIONS

U.S. patent application Ser. No. 14/052,844, filed on Oct. 14, 2013 assigned to the same assignee as the present disclosure, and incorporated herein by reference in its entirety.

U.S. patent application Ser. No. 15/189,210, filed on Jun. 22, 2016 assigned to the same assignee as the present disclosure, and incorporated herein by reference in its entirety.

U.S. patent application Ser. No. 15/263,732, filed on Sep. 13, 2016 assigned to the same assignee as the present disclosure, and incorporated herein by reference in its entirety.

U.S. patent application Ser. No. 15/278,492, filed on Sep. 28, 2016 assigned to the same assignee as the present disclosure, and incorporated herein by reference in its entirety.

TECHNICAL FIELD

This disclosure relates generally to a switch mode power converter. More particularly, this disclosure relates to multiple phase, multiple stage switch mode power converter. Even more particularly, this disclosure relates to regulation of a multiple stage switch mode power converter within a multiple phase, multiple stage switch mode power converter through an intermediate voltage control.

BACKGROUND

Switch mode power converter s that are particularly useful in low-power electronic devices, convert an input power source from a first voltage level to a second voltage level. A typical switch mode power converter (SMPC) is a DC-to-DC switch mode converter that converts the first voltage level to the second voltage level by temporarily storing energy in a magnetic component (e.g., an inductor or transformer) or a capacitor circuit (e.g., switched capacitor circuit) and then releasing the energy, at a different voltage, from the magnetic component or capacitor circuit to a load. FIG. 1 is a schematic of a buck SMPC 5 of the prior art that illustrates the basic structure of a basic SMPC. The schematic of a buck SMPC 5 has three sections, a control section 10, a switch section 15, and a filter section 20. The control section has an error amplifier 25 that receives a reference voltage $V_{REF}$ indicative of the amplitude of the output voltage $V_{OUT}$. The output error voltage $V_{EA}$ of the error amplifier 25 is applied to an out-of-phase input (−) of a comparator 30. The in-phase input (+) of the comparator 30 receives a ramp voltage signal $V_{RAMP}$ from a ramp generator 35. The output of the comparator 30 is a digital logic signal indicating with the error voltage $V_{EA}$ is greater than the reference voltage $V_{REF}$. The output digital signal of the comparator 30 is applied to the reset input of the set-reset latch 40. The reset input (R) deactivates the data output Q to a logical zero state and activates the data output $\overline{Q}$ to a logical one state. The set input (S) of the set-reset latch 40 receives a clock signal $V_{SET}$. The set input (S) activates the data output (Q) to a logical one state and deactivates the data output $\overline{Q}$ to a logical zero state.

The switching transistors $M_P$ and $M_N$ form the switching section 15. The input supply voltage $V_{IN}$ of the SMPC 5 is applied to the source of the switching transistor $M_P$. The source of the switching transistor $M_N$ is connected to the ground reference voltage source. The drains of the switching transistors $M_P$ and $M_N$ are connected together and to a first terminal of the inductor L. The second terminal of the inductor L is connected to a first terminal of the load capacitor $C_L$ and a first input of the electronic load circuit 50. A second terminal of the load capacitor and and the load is connected to the ground reference voltage source.

The data output (Q) is applied to the gate of the p-type switching transistor $M_P$ and the data output $\overline{Q}$ is applied to the gate of the n-type switching transistor $M_N$. The control section 10 forms a pulse width modulator for controlling the switching time of the switching transistors $M_P$ and $M_N$. In turn, the switching transistors $M_P$ and $M_N$ control the flow of the inductor current IL flowing through the inductor L to the load capacitor CL and the load 50 at the output of the buck SMPC 5. The inductor L and the capacitor CL form the filter section 20 of the buck SMPC 5. The filter section 20 removes any of the switching noise at the output voltage $V_{OUT}$ of the buck SMPC 5.

Modern integrated circuits are requiring higher current and lower voltage. A multiphase SMPC responds to this requirement. Multiphase SMPCs employ two or more identical, interleaved converters connected so that their output is a summation of the outputs of the each phase of the multiphase SMPC. Each of the multiple phases historically have a clock signal that operates at a common switching frequency. However, the clock of each phase is shifted so that conversion switching occurs at regular intervals controlled by a common control circuit. The control circuit staggers the switching time of each converter so that the phase angle between each multiphase SMPC switching is 360°/n, where n is the number of multiphase SMPC phases. The outputs of the multiphase SMPCs are paralleled so that the effective output ripple frequency is n×f, where f is the operating frequency of each converter. This provides better dynamic performance and significantly less decoupling capacitance than a single phase SMPC providing equivalent current and voltage.

The multiphase approach to the design of the SMPCs also offers packaging advantages. Each converter delivers 1/n of the total output power, reducing the physical size and inductance of the inductor employed in each phase of the multiphase SMPC. Also, the switching transistors in each phase only need to handle 1/n of the total power. This spreads the internal power dissipation over multiple power devices, thus simplifying the heat management of the multiphase SMPC.

Using the same type of inductors for each phase of multiphase SMPCs maximizes the performance of all of the phases in terms of better transient response, smaller ripple and less harmonic noise. This may not be the best solution in terms of efficiency, in particular in instances where higher efficiency over a wide range of load conditions are required. With smaller inductances of multiphase SMPCs having identical components for each phase, the smaller value inductors give provide good transient response. However, at light load conditions, the smaller inductors have higher AC losses. Further, if one or more of the phases of the multiphase SMPC has a larger value inductor, it will have low AC losses that provide higher efficiency at light load condition.

SUMMARY

An object of this disclosure is to provide methods and circuits for operating a multiple stage switch mode power converter in a multiple phase, multiple stage switch mode power converter system for controlling the remote phases for allowing them to operate independently from the primary stage phase of a multiple stage switch mode power converter while regulating correctly in the whole multiple phase, multiple stage switch mode power converter (SMPC) system.

Another object of this disclosure is to provide methods and circuits for use of an intermediate voltage developed by a primary stage of a multiple stage SMPC to control an output voltage of final stage phases.

Further, another object of this disclosure is to provide methods and circuits for use of an intermediate voltage developed by a primary stage of a multiple stage SMPC to be the input voltage to final stage phases.

Further still, another object of this disclosure is to provide methods and circuits for controlling the intermediate voltage such that the final stage phases of a multiple stage SMPC provide a correct portion of the total load current.

To accomplish at least one of these objects, a multiple phase, multiple stage SMPC system that has at least one single stage SMPC circuit and at least one multiple stage SMPC circuit. The at least one multiple stage SMPC circuit includes a primary stage SMPC circuit and at least one secondary stage of the multiple stage SMPC circuit. The at least one primary stage SMPC circuit is placed in close proximity to the at least one single stage multiple phase SMPC circuit. The at least one secondary stage SMPC circuit is placed remotely to the at least one primary stage SMPC circuit and in close proximity to the electronic load of the multiple phase, multiple stage SMPC system. In various embodiments, the at least one primary stage SMPC circuit and the at least one single stage multiple phase SMPC circuit are collocated within a first functional unit such as a power management circuit. The at least one secondary stage SMPC circuit is located at a remote second functional unit such as system functional unit to be close the functional circuits of an electronic system.

The at least one primary stage SMPC circuit converts the input voltage to the multiple phase, multiple stage SMPC system to an intermediate voltage that is transferred to the at least one secondary stage SMPC circuit. The at least one secondary stage SMPC circuit further converts the intermediate voltage to the output voltage that is applied to the electronic load. The intermediate voltage is applied to a voltage conditioner that transforms the intermediate voltage to be approximately the level of the output voltage to act a reference voltage for the at least one secondary stage SMPC circuit in determining the switching characteristics of the at least one secondary stage SMPC circuit.

The multiple phase, multiple stage SMPC system has a power control circuit that is connected directly to the at least one single stage SMPC circuit and the at least one primary stage of at least one multiple stage SMPC circuit. The power control circuit is configured for transferring a reference level to the at least one single stage SMPC circuit and the at least one primary stage of at least one multiple stage SMPC circuit. The reference maybe a reference voltage, a reference current, or a digital representation of the reference level. In various embodiments, the at least one single stage SMPC circuit and the at least one primary stage of at least one multiple stage SMPC circuit have a digital-to-analog converter for converting the digital representation of the reference level to a reference voltage or a reference current for controlling a pulse width modulator and thus the switching timing of the a switching circuit within the at least one single stage SMPC circuit and the at least one primary stage of at least one multiple stage SMPC circuit. The at least one single stage generates the output voltage required to operate the circuits of the electronic load.

In various embodiments, the output of the at least one primary stage SMPC circuit is connected to a filter for removing noise from the intermediate voltage. Further, the at least one secondary stage SMPC circuit is configured for halting operation of the switching section when the load current approaches a zero level. When the at least one secondary stage SMPC circuit halts the switching operation as the load current approaches the zero level, the at least one single stage SMPC circuit is configured for providing the load current to the load. In some embodiments, the at least one single stage phase SMPC circuit is configured for switching operations from a continuous current mode of operation to a discontinuous mode of operation. In other embodiments, the at least one primary stage SMPC circuit is configured for having a very large DC gain to ensure the static intermediate voltage is always correct and does not droop with a sudden increase in the load current of the output of the at least one secondary stage SMPC circuit.

In various embodiments, the at least one secondary stage SMPC circuit is configured for generating a small offset voltage that is added to the transformed intermediate voltage and compared the output voltage. Comparing of the offset transformed intermediate voltage with the output voltage prevents an enable circuit from activating its enable signal for preventing the remote phases from switching at low loads.

When the comparison indicates the load current is decreasing, the at least one secondary stage SMPC circuit is disabled. The at least one single stage SMPC circuit then regulates the output voltage correctly. When the load current increases, the at least one single stage SMPC circuit increases the load current until the comparison indicates that the load current is increasing dramatically to a high load condition and the at least one secondary stage SMPC circuit is activated.

In some embodiments, the power control circuit that is connected directly to a first control circuit within the at least one single stage SMPC circuit and the at least one single stage SMPC circuit has a first current monitor that senses the output current of the at least single stage SMPC circuit. The level of the sensed current is transferred from the first current monitor to an input of a second control circuit of the at least one primary stage SMPC circuit. The at least one primary stage SMPC circuit has a second current monitor that senses the current at the output of the at least one primary stage SMPC circuit. The output of the second current monitor is connected to a transformation circuit to receive the sensed current from the second current monitor. The sensed current from the second monitor is transformed by the transformation circuit to be equivalent to approximately the output current of the at least one secondary stage SMPC circuit. The transformed sensed current is applied to the input of the second control circuit for comparison with the sensed current of the at least one single stage SMPC circuit e.

The monitoring of the output current of the at least one primary stage SMPC circuit controls the remote at least one secondary stage SMPC circuit output current with respect to the at least one single stage SMPC circuit output current. If the at least one secondary stage SMPC circuit supplies too much current compared to the at least one single stage SMPC circuit, the at least one primary stage SMPC circuit is configured for reducing the intermediate voltage slightly for causing the remote at least one secondary stage SMPC circuit to regulate to a slightly lower voltage. This causes the at least one secondary stage SMPC circuit to reduce its output current. If the remote at least one secondary stage SMPC circuit are supplying too little current compared to the local at least one single stage SMPC circuit, the at least one secondary stage SMPC circuit is configured for increasing the intermediate voltage slightly for increasing the output current of the at least one secondary stage SMPC circuit.

In some embodiments, the load current of intermediate voltage drops to a level that indicates that the load current of the at least one secondary stage phase has a load current that is sufficiently low that the at least one secondary stage SMPC circuit must be disabled. The at least one primary stage SMPC circuit is configured for decreasing the level of the intermediate voltage such that when the transformed intermediate voltage level is compared to the output voltage level, the at least one secondary stage SMPC circuit is deactivated. The at least one single stage SMPC circuit then maintains the regulation of the output voltage. When the load current increases, the first current monitor indicates that the load current is increasing and the at least one primary stage SMPC circuit increases the intermediate voltage level. The transformed intermediate voltage is compared to output voltage and the at least one secondary stage SMPC circuit is activated.

In various embodiments that accomplish at least one of these objects, a method for operating a multiple phase, multiple stage SMPC system begins with activating a main power source to provide power to a first package of an electronic apparatus containing the multiple phase, multiple stage SMPC system. The power applied to the first package is thus applied to at least one single stage SMPC circuit and to at least one single stage of a multiple stage SMPC circuit. The load current is activated and the voltage as applied to the load is regulated and the load is verified to be operating correctly. The load current is monitored to determine if it is increasing or decreasing. If the current is decreasing the intermediate voltage is lowered such that when the transformed or divided intermediate voltage is compared to the output voltage of the at least one secondary stage SMPC circuit, the at least one secondary stage SMPC circuit is deactivated.

In some embodiments, the at least one secondary stage SMPC circuit has an offset voltage generator that is added to the intermediated voltage for the comparison with the output voltage of the at least one secondary stage SMPC circuit. In other embodiments, the intermediate voltage itself is adjusted for the comparison for controlling the activation and deactivation of the at least one secondary stage SMPC circuit.

When the at least one secondary stage SMPC circuit is deactivated, the at least one single stage SMPC circuit begins to operate in a discontinuous current mode and if there are multiple single stage SMPC circuits, each of the single stage SMPC circuits are shed as the current decreases.

If the current is determined to be increasing the at least one single stage SMPC circuit increase its current or in the case of the multiple single stage SMPC circuit begins to add phases until all phases are activated. At that time the intermediate voltage of the at least one primary stage SMPC circuit is increased. The transformed intermediate voltage is offset by an offset voltage, either as a result of the offset voltage generator in the at least one secondary stage SMPC circuit or directly being added to the intermediate voltage by the at least one primary stage SMPC circuit is compared to the output voltage of the at least one secondary stage phase.

When the comparison indicates an increase in the load current of the multiple phase, multiple stage SMPC system is increasing, the at least one secondary stage SMPC circuit is activated and begins regulating it output voltage dependent upon the intermediate voltage as regulated by the at least one primary stage SMPC circuit e.

DETAILED DESCRIPTION

Figure 1:
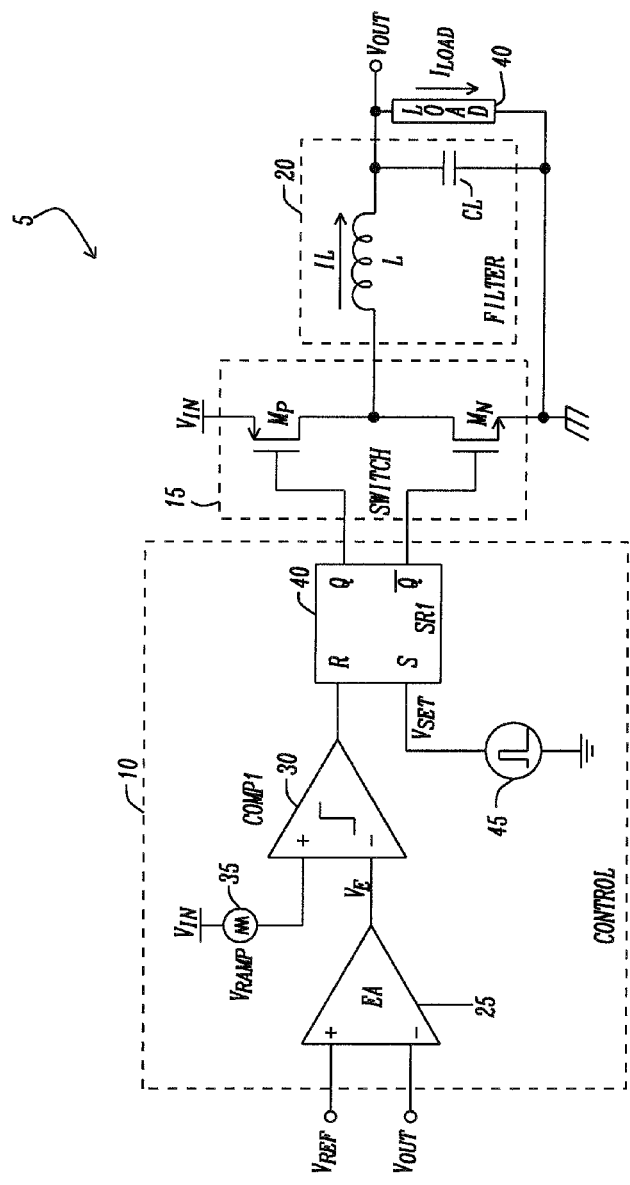
FIG. 1 is a schematic of a buck SMPC of the prior art.

This disclosure details a multiple phase, multiple stage SMPC system. At least one of the multiple phases are single single-stage SMPC circuits and other phases are two-stage SMPC circuits. The single-stage SMPC circuit are instantiated in a power management control unit. The at least one primary stage SMPC circuit of multiple stage SMPC circuits is similarly instantiated in the power management control unit. The at least one secondary stage SMPC circuits are instantiated in at least one system functional unit. In embodiments with multiple functional units, the secondary stage SMPC circuits are placed separate function units for providing power to the functional circuits of each functional unit. The power management control unit and the system functional unit may be separate physical packages, integrated circuit chips or even separate regions of a single system-on-a-chip. The primary stage SMPC circuit of the multiple stage phases are controlled using a local control loop. The secondary stage SMPC circuits are controlled using their own independent control loop.

The multiple phase, multiple stage SMPC system functions as follows: at very low loads the single-stage phases operate independently in either a continuous conduction mode (CCM) or a discontinuous conduction mode (DCM) providing current to the load of the at least one functional unit. At the low load condition, the remote secondary stage phases are deactivated and will not switch, while the primary stages are operating at a near quiescent mode maintaining an intermediate voltage to be provided to the secondary stage phases. When the load increases, the single stage phases begin to increase their current provided to the load and are operating in the continuous current mod. Once the load current has reached a threshold level, the secondary phases are activated. The load current that the secondary stage phases supply is increased as the overall load current is increased. The load current in all the phases, relative to each other, is well controlled, such that the current rises in all the phases, and all phases reach maximum output current at the same time.

In systems requiring a wide range of operational modes including a "sleep" mode, it becomes desirable to mix inductors with different inductance values, sizes and types as described in Related Art Application (RAA) 049.

RAA 089 provides a multiple phase, multiple stage SMPC (buck, boost, or buck-boost). The multiphase SMPC is structured such that some of the phases operate as a single-stage by regulating directly from the supply voltage down to the output voltage and has others of phases operate in a two-stage (or multi-stage) configuration, regulating to an intermediate voltage, and then down to the output voltage. The multiphase SMPC has the single-stage phases operating at a low switching frequency at low loads and the multi-stage phases operating at a high switching frequency at high loads.

The control of the all the phases of the multiple phase, multiple stage SMPC system is easily accomplished if all the phases are controlled using a single power management control circuit. The power management control circuit controls every phase and therefore has knowledge of the state of every phase to provide the necessary control signals. FIG. 2 is a schematic of a multiple phase, multiple stage SMPC where the stages of the multiple stage phases are physically separated on separate functional units. The multiple phase, multiple stage SMPC has a system power management unit 100 that contains the single stage phases and the primary stage phases of the multiple phase, multiple stage SMPC. The system power management unit 100 has a power control circuit 110 for providing control signals to the at least one single stage SMPC circuit phase 115a, . . . , 115n. The single stage phases 115a, . . . , 115n consist of the pulse width modulator circuit similar to the control circuit 10 of FIG. 1 and the switching circuit 15 of FIG. 1. Each of the single stage phases 115a, . . . , 115n has an inductor $L_{11}$, . . . , $L_{1n}$ where the output of the single stage phases 115a, . . . , 115n are connected to the first terminal of the associated inductors $L_{11}$, . . . , $L_{1n}$. The second terminals of the inductors $L_{11}$, . . . , $L_{1n}$ are connected to the first terminal of the load capacitor CL and the electronic load 130. The second terminals of the load capacitor CL and the electronic load 130 are connected to the ground reference voltage source. The load capacitor CL and the electronic load 130 are mounted in the system functional unit 105 that is physically separated from the system power management controller 100. The system power management controller 100 and the system functional unit 105 may be separate physical packages, integrated circuit chips or even separate regions of a single system-on-a-chip.

The power control circuit 110 provides the control signals to the at least one primary stage SMPC circuit 120 of the multiple stage SMPC circuit. The multiple stage SMPC circuit includes the at least one primary stage SMPC circuit 120 and the multiple phases of the remote secondary stage SMPC circuit 125a, . . . , 125n. The remote secondary stage SMPC circuit phases 125a, . . . , 125n are mounted also on the system functional unit 105. The primary stage SMPC circuit 120 of the multiple stage SMPC circuit consists of the pulse width modulator circuit similar to the control circuit 10 of FIG. 1 and the switching circuit 15 of FIG. 1. The output of the primary stage 120 of the multiple stage SMPC is connected to the first terminal of the associated inductor $L_{21}$. The second terminals of the inductor $L_{21}$ is connected to output terminals of the system power management controller 100, which, in turn, is connected to an input terminal of the system functional unit 105 and thus to the inputs of the remote secondary stage SMPC circuit phases 125a, . . . , 125n.

Figure 2:
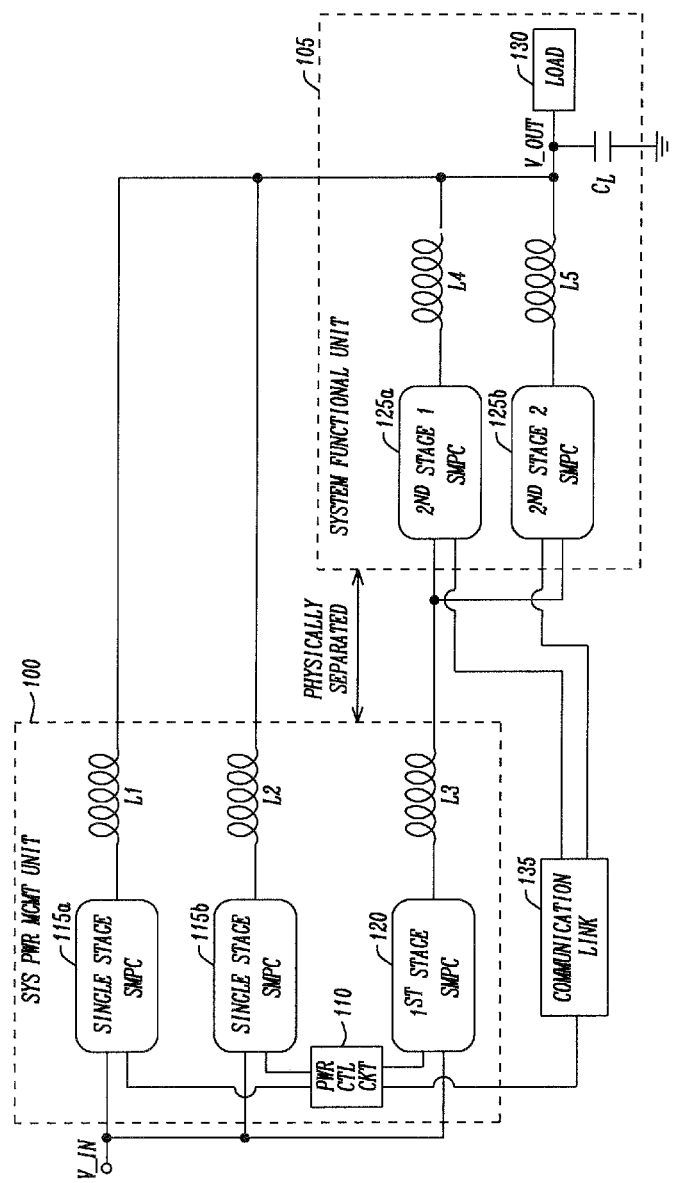
FIG. 2 is a schematic of a multiple phase, multiple stage SMPC of the related art.

The multiple phases of the remote secondary stage SMPC circuit phases 125a, . . . , 125n of the multiple stage SMPC circuit consists of the pulse width modulator circuit similar to the control circuit 10 of FIG. 1 and the switching circuit 15 of FIG. 1. The outputs of the multiple phases of the remote secondary stage SMPC circuit phases 125a, . . . , 125n of the multiple stage SMPC circuit is connected to the first terminal of the associated inductors $L_{31}$, . . . , $L_{3n}$. The second terminals of the associated inductors $L_{31}$, . . . , $L_{3n}$ are connected to first terminals of the load capacitor CL and the electronic load 130 to provide the output voltage $V_{OUT}$ to the electronic load 130.

The power unit 110 is connected to an output terminal(s) of the power system management controller 100 for connection to a communication link 135 that is connected to an input terminal of the system functional unit 105 and thus to the inputs of the remote secondary stage SMPC circuit phases 125a, . . . , 125n. The secondary stage SMPC circuit phases 125a, . . . , 125n are placed physically close to the point of the electronic load 130.

One of the issues with the multiple phase, multiple stage SMPC of FIG. 2 is control of the remote secondary stage SMPC circuit phases 125a, . . . , 125n. The single stage SMPC circuit phases 115a, . . . , 115n, primary stage SMPC circuit phase 120, and the remote secondary stage SMPC circuit phases 125a, . . . , 125n need to be controlled as part of the control by the power control circuit 100 to completely control the multiple phase, multiple stage SMPC system, using the same control signals for all the phases 115a, . . . , 115n, 120, and 125a, . . . , 125n. This allows efficiency to be maximized. However, this requires significant interconnecting signals between the two physical packages 100 and 105 containing the single stage SMPC circuit phases 115a, . . . , 115n, primary stage SMPC circuit phase 120, and the remote secondary stage SMPC circuit phases 125a, . . . , 125n.

Having multiple locations for the single stage SMPC circuit phases 115a, . . . , 115n, primary stage SMPC circuit phase 120, and the remote secondary stage SMPC circuit phases 125a, . . . , 125n complicates the interconnecting wiring for each of the control signals to be connected between the power management control circuit and the single stage phases, the primary stage phases and the secondary stage phases. This is particularly true if the secondary stage phases are distributed across multiple system functional units 105 and the control signal must now be transferred on multiple communication links 135. To minimize the control signals and effectively eliminate the communication link 135, this disclosure minimizes the control wiring issue by controlling an intermediate voltage between the primary and secondary stage phases.

Figure 3:
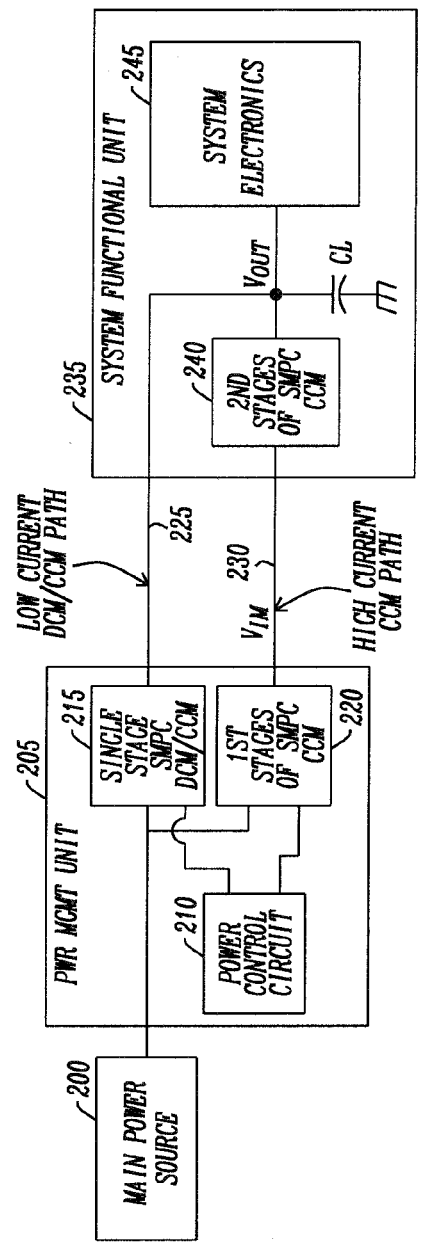
FIG. 3 is a block diagram of an electronic apparatus of the present disclosure.

FIG. 3 is a block diagram of an electronic apparatus of the present disclosure. The electronic apparatus has a main power source 200 such as a battery or connections to the utility power mains. The main power source 200 provides voltage and current to the power management circuit 205. The power management circuit 205 has a power control circuit that provides control signals for controlling the single stage phases of the SMPC circuits 215 and the primary stage phases of the multiple stage phases of the SMPC circuits 220. The single stage phases of the SMPC circuits 215 are buck SMPCs, as shown in FIG. 1, boost SMPC circuits, buck-boost SMPCs, or other known SMPCs. The single stage phases of the SMPC circuits 215 are configured for providing low current for a low load current requirement and may operate in the CCM mode or the DCM mode as required.

The primary stage phases of the multiple stage phases of the SMPC circuits 220 are similarly buck SMPCs, as shown in FIG. 1, boost SMPC circuits, buck-boost SMPCs, or other known SMPCs. The primary stage phases of the multiple stage phases of the SMPC circuits 220 provide high current for a high load current. The primary stage phases of the multiple stage phases of the SMPC circuits 220 are configured to operate at a higher switching frequency and have smaller component packages than the single stage phases of the SMPC circuits 215 thus making the physical packaging more economical.

The output interconnections 225 and 230 of the single stage phases of the SMPC circuits 215 and the primary stage phases of the SMPC circuits 220 are connected to the electronic system's functional unit 235. The functional unit 235 has the secondary stage phases of the SMPC circuits 240 that is connected with the output of the primary stage phases of the SMPC circuits 220 to the load capacitor CL and to the functional system electronic load 245. When the electronic load 245 is operating in a low load condition the single stage phases of the SMPC circuits 215 operates in a low load condition that is in either the CCM mode or the DCM mode. As the load current of the electronic load 245 increases, the single stage phases of the SMPC circuits 215 increase their output currents until a threshold is reached at which time the secondary stage phases 240 are activated. The primary and secondary stage phases of the SMPC circuits 220 and 240 begin to provide the high current levels to the electronic load 245. To provide the necessary controls to the secondary stage phases 240, the primary stage phases 220 vary the intermediate voltage level $V_{IM}$ at the output of the primary stage phases 220.

The secondary stage phases 240 located remotely on the system functional unit 235 regulate to a fixed fraction of the intermediate voltage $V_{IM}$. So, for a simple example, assume the remote secondary stage phases regulate to half the intermediate voltage $V_{IM}$. The multiple phase, multiple stage SMPC system is then set to regulate to 0.8V. The primary stage phases 220 regulate the intermediate voltage $V_{IM}$ to 1.6V. The secondary stage phase has a resistor divider 255 (described hereinafter) that has an input terminal connected to receive the intermediate voltage $V_{IM}$ and the mid-point terminal of the resistor divider 255 provides a fractional voltage $V_{REF3}$ that is compared to the output voltage $V_{OUT}$. This will then cause the multiple phase, multiple stage SMPC system to regulate to half the supply voltage, which is 0.8V as required. In this way, the output voltage of each of the secondary stage phases 240 is controlled to be regulated to match the output voltage level $V_{OUT}$ of the primary stage phases 215.

Figure 4:
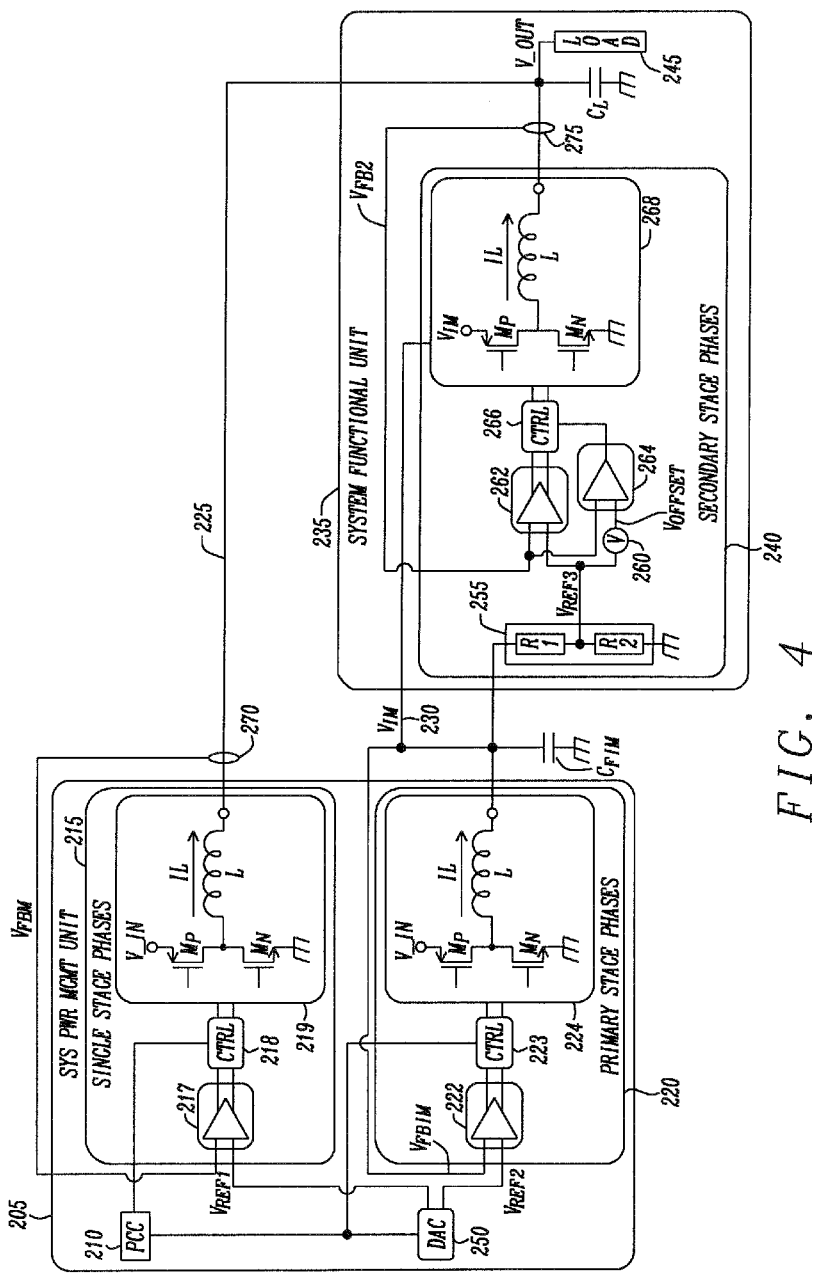
FIG. 4 is a schematic diagram of a multiple phase, multiple stage SMPC system incorporated in the electronic apparatus of the present disclosure as shown in FIG. 3.

FIG. 4 is a schematic diagram of a multiple phase, multiple stage SMPC system incorporated in the electronic apparatus of the present disclosure as shown in FIG. 3. The power management unit 205 has the power control circuit 210 connected to the single stage phases of the SMPC 215 and the primary stage phases 220 of the multiple stage phases. The multiple stage SMPC is formed of at least one primary stage phase 220 connected to at least one secondary stage phase 240 mounted on the system functional unit 235.

The secondary stage phase 240 may be multiple phases and have additional stages effectively forming a tree structure. The single stage phases 215 are illustrated as one stage but may be multiple stages. There is no theoretical limit to the number of stages. In reality each stage erodes the efficiency, so a two-stage is potentially the largest number of stages practical. The structure as illustrated is used for simplicity of explanation.

The power control circuit 210 is connected to a digital-to-analog converter 250 that is configured for providing the reference voltages $V_{REF1}$ and $V_{REF2}$, respectively, to the single stage phases 215 and the primary stage phases 220 of the multiple stage phases. The reference voltages $V_{REF1}$, as provided by the digital-to-analog converter 250 to the single stage phases 215, is applied to an error amplifier 217. The error amplifier 217 receives a main feedback voltage $V_{FBM}$ from the sensor 270. The sensor 270 monitors the output voltage $V_{OUT}$ of the multiple phase, multiple stage SMPC system. The output of the single stage phases 215 is connected through the interconnection 225 to the voltage supply input of the electronic load 245. The main feedback voltage $V_{FBM}$ is indicative of the level of the output voltage $V_{OUT}$. The output of the error amplifier 217 is an error signal that is applied to the control circuit 218. A second input of the control circuit 218 is first mode control signal from the power control circuit 210. The error signal and the first mode control signal generate the gate signals for the switching transistors $M_P$ and $M_N$ of the switching section 219 for controlling inductor current in the CCM mode or the DCM mode.

The reference voltages $V_{REF2}$, as provided by the digital-to-analog converter 250 to the primary stage phases 220, is applied to an error amplifier 222. The error amplifier 222 receives an intermediate feedback voltage $V_{FBIM}$ directly from the output terminal and interconnection 230 and indicative of the level of the intermediate voltage $V_{IM}$ generated by the primary stage phases. The output of the primary stage phases is connected through the interconnection 230 to the secondary stage phases 240 in the system functional unit 235. The output of the error amplifier 222 is an error signal that is applied to the control circuit 223. A second input of the control circuit 218 is a second mode control signal from the power control circuit 210. The control circuit 218 is configured for combining the error signal and the second mode control signal to generate the gate signals for the switching transistors $M_P$ and $M_N$ of the switching section 224 for controlling inductor current IL through the inductor L. The second terminal of the inductor L is connected to the first terminal of the filter capacitor $C_{FIM}$ for filtering the high frequency components of the switching signal noise. The second terminal of the filter capacitor $C_{FIM}$ is connected to the ground reference voltage source. The junction of the second terminal of the inductor L and the first terminal of the filter capacitor $C_{FIM}$ is connected to the input of the system functional unit 235 and thus to the switching section 268 and an intermediate voltage transformation circuit 255 to provide the filtered intermediate voltage $V_{IM}$.

The intermediate voltage transformation circuit 255 as shown is a voltage divider formed by the resistors R1 and R2. The intermediate feedback voltage $V_{FBIM}$ is applied to the first terminal of the resistor R1 and the second terminal of the resistor R1 is connected the first terminal of the second resistor R2. The second terminal of the resistor R2 is connected to the ground reference voltage source.

The common connection of the resistors R1 and R2 is connected to a first terminal of the error amplifier 264 for providing a transformed intermediate voltage that forms the third reference voltage $V_{REF3}$. The second terminal of the error amplifier 264 receives a secondary feedback voltage $V_{FB2}$ from sensor 275. The sensor 275 monitors the output voltage $V_{OUT}$ at the load capacitor $C_L$ and the input terminal to the electronic load 245. The output of the error amplifier 264 is the applied to the input of the control circuit 266.

The common connection of the resistors R1 and R2 is connected to a first terminal of an offset voltage source 260. The second terminal of the offset voltage source 260 is connected to a first input of a comparator 264. The second input terminal of the comparator 264 is connected to receive a secondary feedback voltage $V_{FB2}$ from sensor 275. The output of the comparator 264 is connected to the second input of the control circuit 266. The offset voltage source is combined with the third reference voltage VREF3 to generate an offset reference voltage $V_{OFFSET}$. The offset reference voltage $V_{OFFSET}$ is compared with the secondary feedback voltage $V_{FB2}$ to determine when the output voltage $V_{OUT}$ has decreased to a voltage level that the secondary stage phases are to be deactivated or the output voltage $V_{OUT}$ has increased such that the secondary stage phases are to activated.

The comparator 264 and the amplifier 262 receive the secondary feedback voltage $V_{FB2}$ from sensor 275 at the output voltage $V_{OUT}$ of the multiple phase, multiple stage SMPC system. This is a voltage signal that is directly related to the voltage level $V_{OUT}$ of the multiple phase, multiple stage SMPC system. In some embodiments, the output current may be sensed by the sensor 275 as the feedback signal. This is known in the art and is not discussed.

If the output of the comparator 264 indicates that the load current has decreased past a threshold, the control circuit 266 deactivates the switching transistors $M_P$ and $M_N$ of the switching section 268. If the output of the comparator 264 indicates that the load current has increased past the threshold and the switching transistors are deactivated $M_P$ and $M_N$, the control control circuit 266 turns on the switching transistors $M_P$ and $M_N$ according the pulse width modulated control signals from the control circuit 266 to control the output voltage $V_{OUT}$ to provide the inductor current IL to the load capacitor $C_L$ and the electronic load 245 during the active period of the secondary stage phases 240.

When the secondary stage phases 240 are supplying power to the electronic load 245, the intermediate voltage $V_{IM}$ will to droop if the primary stage phases 220 have finite output impedance. To prevent voltage droop at the output of the primary stage phases 220, The primary stage phases 220 have very high DC gain of an integrating control system to ensure the static intermediate voltage maintains its correct voltage level. Any transient under-shoots and over-shoots are removed by the filtering with the intermediate filtering capacitor $V_{IM}$.

If the single-stage phases 215 are controlled using a proportional control system configured to have a finite output impedance, the output voltage falls proportional to the load. To take advantage of this characteristic, the secondary stage phases 240 are provided with the small offset voltage source 260 to ensure the secondary stage phases 240 do not switch when the multiple phase, multiple stage SMPC system is in regulation with low load.

This structure of the primary and secondary stage phase will regulate correctly. When the electronic load 235 is sinking a low load current, the primary stage phases 220 regulate at the target intermediate voltage $V_{IM}$ and the remote secondary stage phases 240 are not switching. As the load current required by the electronic load 245 increases, the output voltage $V_{OUT}$ of the multiple phase, multiple stage SMPC system decreases such that the comparator 264 activates the switching circuit to turn on the remote secondary stage phases 240. As the load current demanded by the electronic load 245 increases further the output voltage $V_{OUT}$ continues to decrease further and all the single stage phases 215, the primary stage phases 220, and the secondary stage phases 240 increase their output current through the inductors L together.

Figure 5:
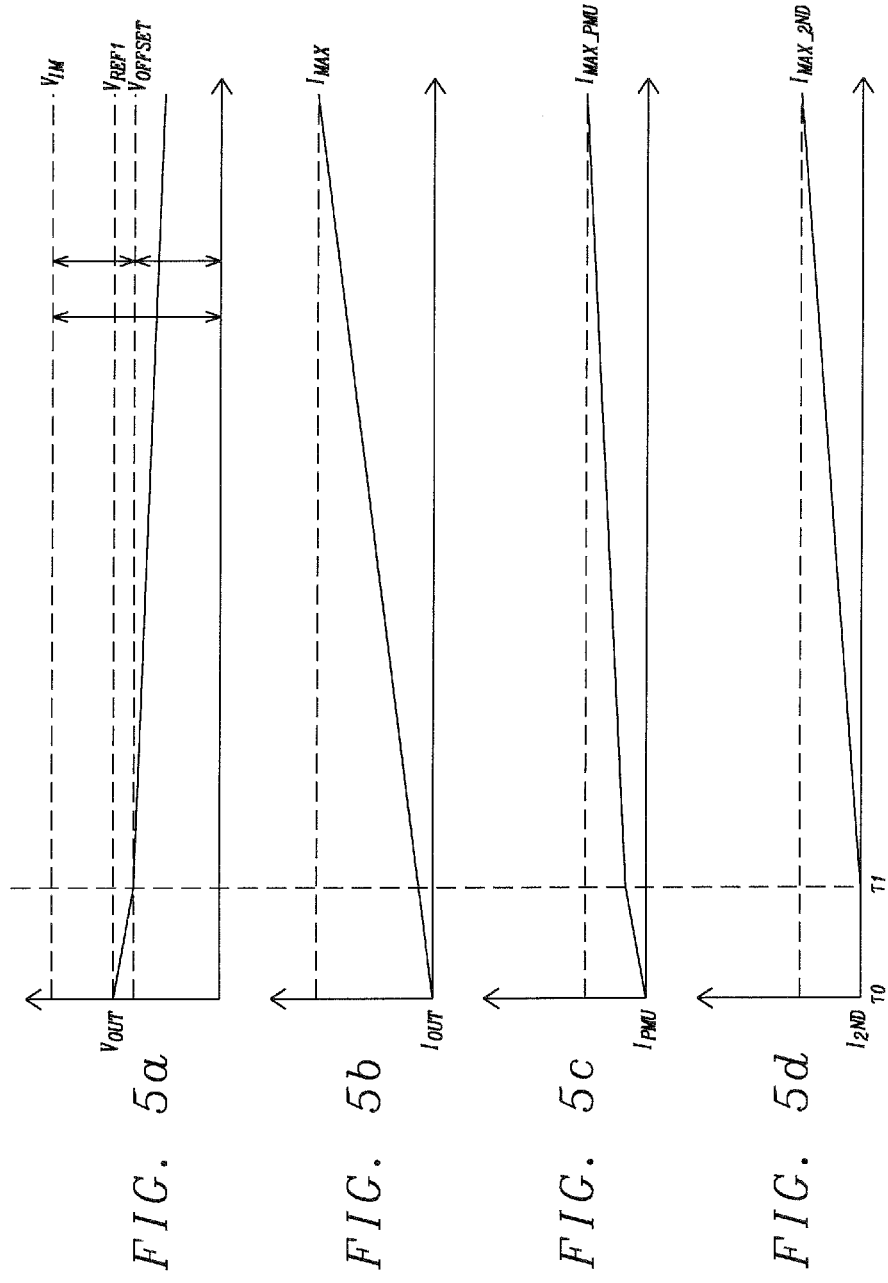
FIGS. 5a-5d are a plots of the voltage and current levels illustrating the transconductance of the multiple phase, multiple stage SMPC of FIG. 4 with the contributions from the single stage SMPC circuit and the primary stage SMPC circuit.

FIGS. 5a-5d are a plots of the voltage and current levels illustrating the transconductance of the multiple phase, multiple stage SMPC of FIG. 4 with the contributions from the single stage phases 215, the primary stage phases 220. Referring to FIG. 5a, the output voltage $V_{OUT}$ starts at the target reference voltage $V_{REF1}$ at the time $\tau_0$ when the load current being sunk by the electronic load 245 is at a minimum as shown in FIG. 5b. When the electronic load 245 demands more load current, the output voltage $V_{OUT}$ decreases until it reaches the offset threshold voltage $V_{OFFSET}$, at the time $\tau_1$. At the time $\tau_1$, the secondary stage phases 240 are activated and the output current IL of the secondary stage phases 240 begin to increase from a zero level. Prior to the time $\tau_1$, the load current is supplied by the single stage phases 215 of the power management unit 205. Subsequent to the time $\tau_1$, the load current $I_{OUT}$ to the electronic load 245 is the sum of the inductor currents IL from the single stage phases 215 and the secondary stage phases 240.

The offset threshold voltage $V_{OFFSET}$ is the voltage level of the offset voltage source 264 applied to the comparator 264 that controls the activation and deactivation of the switching section 268 of the secondary stage phases 240. The intermediate voltage $V_{IM}$ is the output voltage of the primary stage phases 220 and is a fixed multiple of the offset threshold voltage $V_{OFFSET}$. In the case as illustrated the intermediate voltage $V_{IM}$ is two times the offset threshold voltage $V_{OFFSET}$.

The inductor currents IL from the single stage phases 215 and the secondary stage phases 240 each rise until they reach their respective maximum currents $I_{MAX-PMU}$ and $I_{MAX-2ND}$. The load current $I_{OUT}$ to the electronic load 245 is then at its maximum current $I_{MAX}$. In the multiple phase, multiple stage SMPC as described, neither the single-stage phases 215 nor the second-stage phases 240 use an integrator in the control loop. The primary-stage phases 220 do make use of an integrator to ensure the intermediate voltage $V_{IM}$ can be used for control. The multiple phase, multiple stage SMPC therefore has finite output impedance, and the output voltage will fall as the load current is increased.

Figure 6:
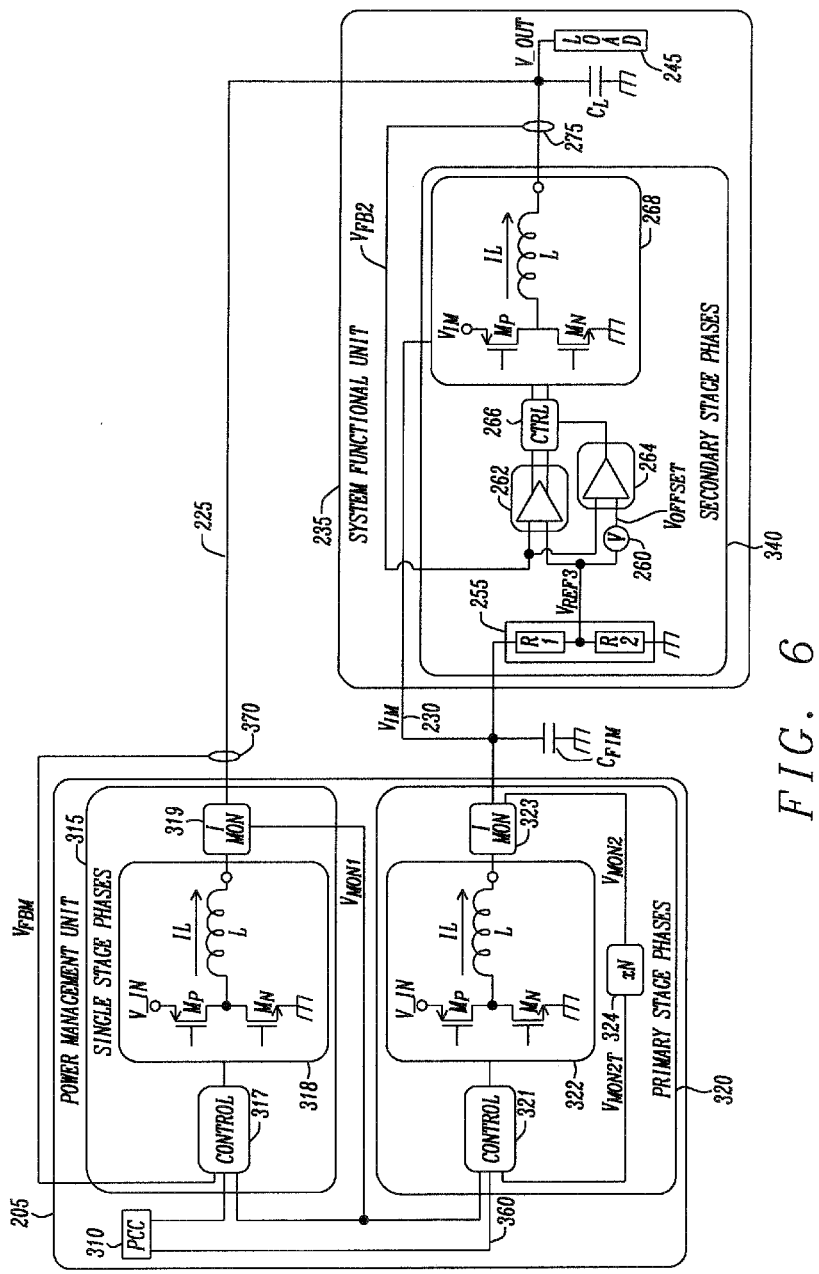
FIG. 6 is a schematic diagram of a second embodiment of a multiple phase, multiple stage SMPC system incorporated in the power distribution system of the present disclosure as shown in FIG. 3.

FIG. 6 is a schematic diagram of a second embodiment of a multiple phase, multiple stage SMPC incorporated in the power distribution system of the SMPC of the present disclosure as shown in FIG. 3. The power management unit 205 has the power control circuit 210 connected to the single stage phases of the SMPC 315 and the first stage phases 320 of the multiple stage phases. The multiple stage SMPC is formed of at least one primary stage phase 320 connected to at least one secondary stage phase 340 mounted on the system functional unit 235. The secondary stage phase 340 may be multiple phases and have additional stages effectively forming a tree structure. The single stage phases 315 are illustrated as one stage but may be multiple stages. The structure as illustrated is used for simplicity of explanation.

The power control circuit 310 is configured for providing the reference voltages $V_{REF1}$ 317 and is connected to a control circuit 317 of the single stage phases 315. The control circuit 317 receives a main feedback voltage $V_{FBM}$ from the sensor 370. The sensor 370 monitors the output voltage $V_{OUT}$ of the multiple phase, multiple stage SMPC system. The output of the single stage phases 315 is connected through the interconnection 225 to the voltage supply input of the electronic load 245. The main feedback voltage $V_{FBM}$ is indicative of the level of the output voltage $V_{OUT}$. The outputs of the control circuit 317 are the gate signals for the switching transistors $M_P$ and $M_N$ of the switching section 219 for controlling inductor current in the CCM mode or the DCM mode. The output of the switching section 317 is connected through the interconnection 225 to the voltage supply input of the electronic load 245 to provide the load current. The current monitor 319 senses the inductor current IL being transferred to the electronic load 245. The current sense signal $V_{MON1}$ is transferred to the control circuit 317. The control circuit 317 determines from the current sense signal $V_{MON1}$ if the single stage phases should be operating in CCM mode or DCM mode and controls the gate signals to the switching section 219 accordingly.

The sense signal $V_{MON1}$ is applied to the input of the control circuit 321 of the primary stage phases 320 of the multiple stage phases. The outputs of the control circuit 321 is connected to the switching section 322 to control the activation and deactivation of the switching transistors $M_P$ and $M_N$. The output current of the switching section is monitored by the current monitor 323 and the current sense signal $V_{MON2}$ is an estimate of the value of the output current of the primary stage phases 320. The current sense signal $V_{MON2}$ is applied to a transformation circuit 324 that is configured to transform the value from the output current of the primary stage phases 320 and thus the input current of the secondary stage phases 340 to approximately the value of the output current of the secondary stage phases 340. The transformed current sense signal $V_{MON2T}$ is applied to a second input of the control circuit 321.

The first current sense signal $V_{MON1}$ and the transformed current sense signal $V_{MON2T}$ are compared and the comparison is used to regulate the relative output current of the single stage phases 315 and the output current of the secondary stage phases 340 such that they are well controlled. In some embodiments, the transformed current sense signal $V_{MON2T}$ is compared to a threshold quiescent current value to establish whether the secondary stage phases 340 are activated or deactivated.

The switching section 322 transfers the inductor current IL through the current monitor 323 to the output terminal of the primary stage phases 320 to be applied to the filter capacitor $C_{FIM}$ that filters the high frequency components from the intermediate voltage $V_{IM}$. The intermediate voltage $V_{IM}$ is transferred through the interconnection 230 to the input terminal of the secondary stage phases 340 in the system functional unit 235. The input terminal of the secondary stage phases 240 is connected an intermediate voltage transformation circuit 255 to provide the filtered intermediate voltage $V_{IM}$.

The intermediate voltage transformation circuit 255 as shown is a voltage divider formed by the resistors R1 and R2. The intermediate feedback voltage $V_{FBIM}$ is applied to the first terminal of the resistor R1 and the second terminal of the resistor R1 is connected the first terminal of the second resistor R2. The second terminal of the resistor R2 is connected to the ground reference voltage source.

The common connection of the resistors R1 and R2 is connected to a first terminal of the error amplifier 264 for providing a transformed intermediate voltage that forms the third reference voltage $V_{REF3}$. The second terminal of the error amplifier 264 receives a secondary feedback voltage $V_{FB2}$ from sensor 275. The sensor 275 monitors the output voltage $V_{OUT}$ at the load capacitor $C_L$ and the input terminal to the electronic load 245. The output of the error amplifier 264 is the applied to the input of the control circuit 266.

The common connection of the resistors R1 and R2 is connected to a first terminal of an offset voltage source 260. The second terminal of the offset voltage source 260 is connected to a first input of a comparator 264. The second input terminal of the comparator 264 is connected to receives a secondary feedback voltage $V_{FB2}$ from sensor 275. The output of the comparator 264 is connected to the second input of the control circuit 266. The offset voltage source is combined with the third reference voltage $V_{REF3}$ to generate an offset reference voltage $V_{OFFSET}$. The offset reference voltage $V_{OFFSET}$ is compared with the secondary feedback voltage $V_{FB2}$ to determine when the output voltage $V_{OUT}$ has decreased to a voltage level that the secondary stage phases are to be deactivated or the output voltage $V_{OUT}$ has increased such that the secondary stage phases are to activated.

If the output of the comparator 264 indicates that the load current has decreased past a threshold, the control control circuit 266 deactivates the switching transistors $M_P$ and $M_N$ of the switching section 268. If the output of the comparator 264 indicates that the load current has increased past the threshold and the switching transistors are deactivated $M_P$ and $M_N$, the control control circuit 266 turns on the switching transistors $M_P$ and $M_N$ according the pulse width modulated control signals from the control circuit 266 to control the output voltage $V_{OUT}$ to provide the inductor current IL to the load capacitor $C_L$ and the electronic load 245 during the active period of the secondary stage phases.

As noted above, the secondary stage phases 340 must be prevented from switching at low load current. In some embodiment the offset voltage $V_{OFFSET}$ is added to the intermediate voltage rather than in the remote secondary stage phases as the offset voltage source 260. The level of the offset voltage $V_{OFFSET}$ is controlled by the power control circuit 210 through the offset control interconnection 360. As noted above, monitoring the output current of the primary stage phases with the current monitor 323 that is required by the intermediate voltage determines that the secondary stage phases 340 are activated or deactivated. When the multiple phase, multiple stage SMPC is providing a low load current to the electronic load 245, the power control circuit 210 commands primary stage phases to reduce the intermediate voltage $V_{IM}$ until the secondary stage phases 340 stop switching. When the secondary stage phases 340 stop switching, the current monitor 323 detects the cessation of the switching by a drop in load current being supplies to the secondary stage phases 340.

In some embodiments, the single stage phases 315 and the secondary stage phases 340 are regulated using a high DC gain loop with an integrating function to ensure zero DC output impedance. The intermediate voltage $V_{IM}$ must be controlled to rise linearly as the load current of the secondary stage phases 340 is increased. In other embodiments, the single stage phases 315 and the secondary stage phases 340 are controlled using a finite output impedance. In this instance, as the target voltage is increased, the output current of the single stage phases 315 and the secondary stage phases 340 will increase such that the multiple phase, multiple stage SMPC will have zero effective DC output impedance.

Figure 7:
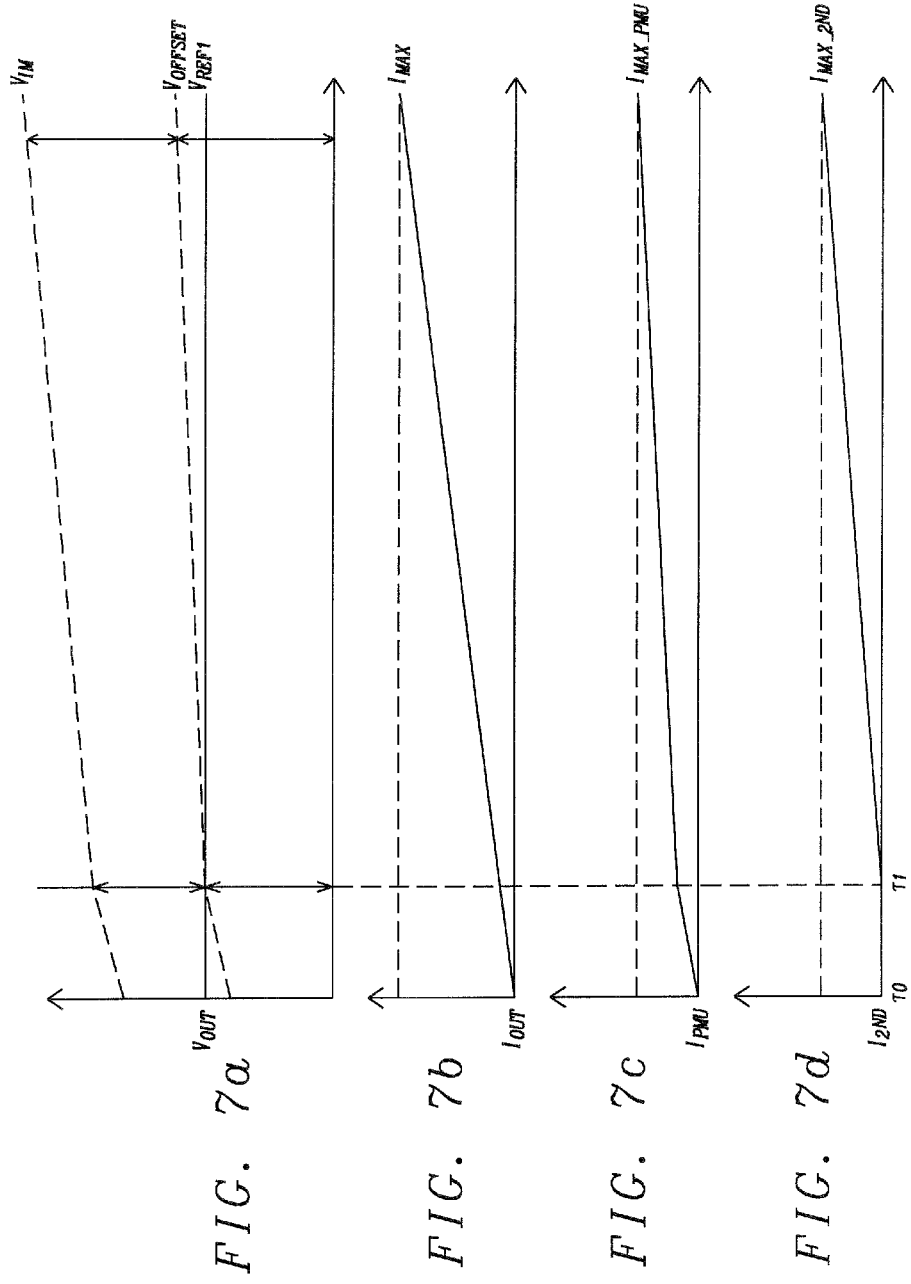
FIGS. 7a-7d are a plots of the voltage and current levels illustrating the transconductance of the multiple phase, multiple stage SMPC of FIG. 6 with the contributions from the single stage SMPC circuit and the primary stage SMPC circuit.

FIGS. 7a-7d are a plots of the voltage and current levels illustrating the transconductance of the multiple phase, multiple stage SMPC of FIG. 6 with the contributions from the single stage phases 315 and the primary stage phases 320. The single stage phases 315 and the primary stage phases 320 each have a feedback loop that is configured as an integrator to insure that the multiple phase, multiple stage SMPC has zero effective DC output impedance. The zero effective DC output impedance sets the static output voltage $V_{OUT}$ is always exactly equal to the target reference voltage $V_{REF3}$, as shown in FIG. 7a. The secondary stage phases 340 are not configured to have an integrator in their control feedback loop. The target offset threshold voltage $V_{OFFSET}$ is now controlled to rise as the output current $I_{PMU}$ of the single stage phases 315 and the primary stage phases 320 rises. The increase in the target offset threshold voltage $V_{OFFSET}$ is a result of the power control circuit 210 causing the primary stage phases 320 to increase the intermediate voltage $V_{IM}$ to force the intermediate voltage $V_{IM}$ to be a fixed multiple of the intended target offset threshold voltage $V_{OFFSET}$.

Referring to FIG. 7a, the output voltage $V_{OUT}$ starts at the target reference voltage $V_{REF1}$ at the time $\tau_0$ when the load current being sunk by the electronic load 245 is at a minimum as shown in FIG. 7b. When the electronic load 245 demands more load current, the offset threshold voltage $V_{OFFSET}$ rises until it reaches the level of the output voltage $V_{OUT}$, at the time $\tau_1$. At the time $\tau_1$, when the offset threshold voltage $V_{OFFSET}$ is the appropriate level greater than the feedback voltage $V_{FB}$ of the secondary stage phases 240, the secondary stage phases 340 are activated and the output current $I_{2nd}$ of the secondary stage phases 340 begin to increase from a zero level. Prior to the time $\tau_1$, the load current is supplied by the single stage phases 315 of the power management unit 205. Subsequent to the time $\tau_1$, the load current $I_{OUT}$ to the electronic load 245 is the sum of the inductor currents IL from the single stage phases 315 and the secondary stage phases 340.

The offset threshold voltage $V_{OFFSET}$ is applied to the comparator 264 that controls the activation and deactivation of the switching section 268 of the secondary stage phases 240. The intermediate voltage $V_{IM}$ is the output voltage of the primary stage phases 220 and is a fixed multiple of the offset threshold voltage $V_{OFFSET}$.

The inductor currents IL from the single stage phases 215 and the secondary stage phases 240 each rise until they reach their respective maximum currents $I_{MAX-PMU}$ and $I_{MAX-2ND}$. The load current $I_{OUT}$ to the electronic load 245 is then at its maximum current $I_{MAX}$. The output voltage $V_{OUT}$ of the multiple phase, multiple stage SMPC remains constant as the output current $I_{OUT}$ increases. Since the output voltage $V_{OUT}$ of the multiple phase, multiple stage SMPC remains constant, intermediate voltage $V_{IM}$ decreases and thus the offset threshold voltage $V_{OFFSET}$ decreases.

The integrator in the multiple phase, multiple stage SMPC control loop compares the difference between the reference voltage $V_{REF1}$ and the actual output voltage $V_{OUT}$ of the multiple phase, multiple stage SMPC. It then integrates this error over time and moves the intermediate voltage $V_{IM}$ as necessary to reduce this error to zero. If the output voltage $V_{OUT}$ is too low, the control loop will increase the amplitude of the intermediate voltage $V_{IM}$. The multiple phase, multiple stage SMPC will then respond by increasing the output voltage $V_{OUT}$, and this will reduce the voltage error at the output of the multiple phase, multiple stage SMPC. This process will continue to do this until the error is zero. At very high loads, the multiple phase, multiple stage SMPC is unable to continue regulating correctly and the intermediate voltage $V_{IM}$ may saturate. In this case the output voltage $V_{OUT}$ will start to fall with increasing load.

Figure 8:
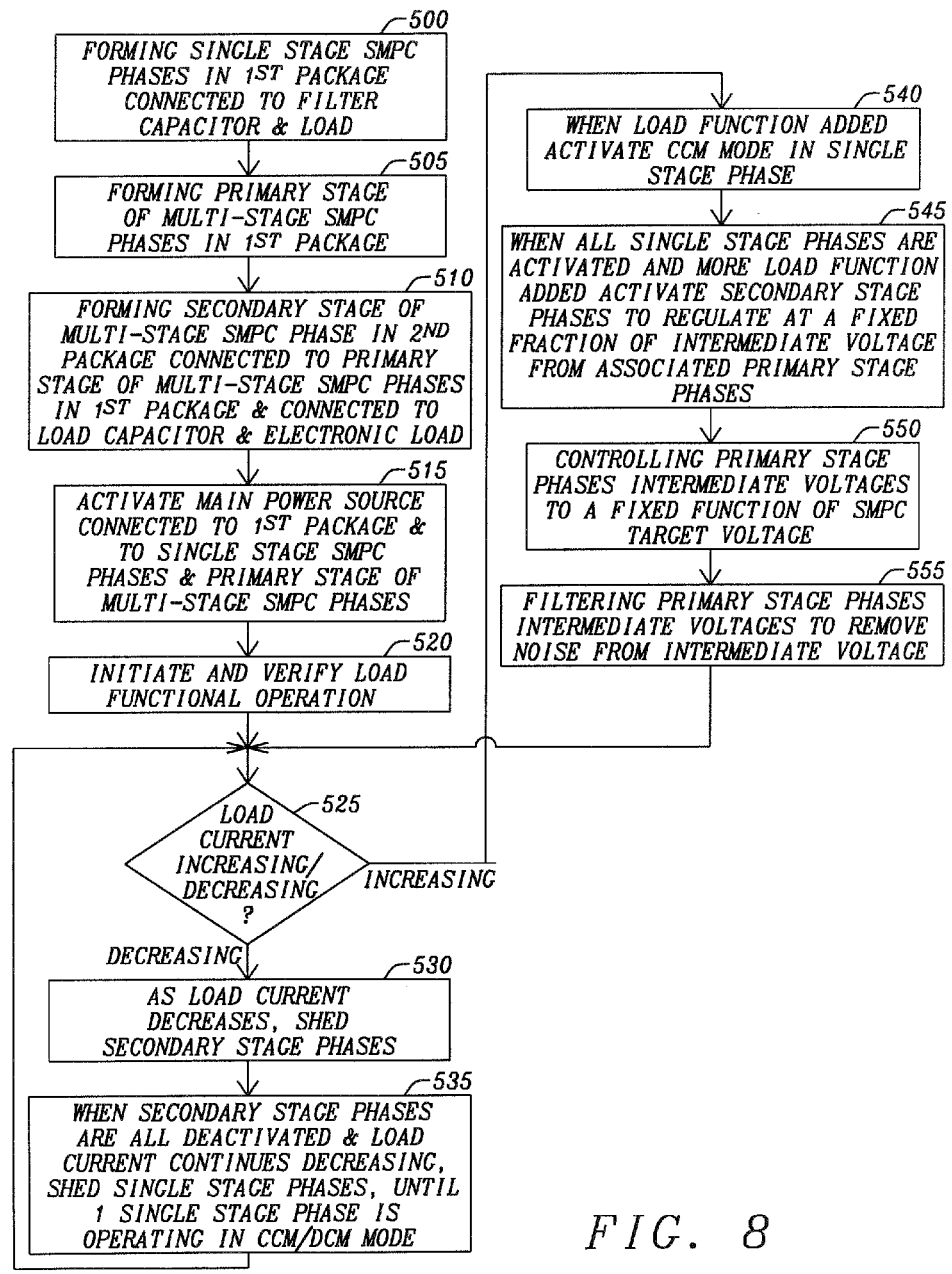
FIG. 8 is a flowchart of a method of operation of a multiple phase, multiple stage SMPC system.

FIG. 8 is a flowchart of a method of operation of a multiple phase, multiple stage SMPC system. The multiple phase, multiple stage SMPC system is structured by forming (Box 500) single stage SMPC circuit phases and placed on a first package of an electronic apparatus where the single stage phases are connected to a load capacitor and an electronic load that is assembled on a second package. The multiple phase, multiple stage SMPC system is further structured by forming (Box 505) primary stage SMPC circuit phases of a multiple stage SMPC and placed on the first package. The multiple phase, multiple stage SMPC system is still further structured by forming (Box 510) secondary stage SMPC circuit phases of a multiple stage SMPC and placed on the second package. The output of the primary stage phases is connected to the secondary stage phases through interconnections from the first package to second package. The output of the secondary stage phases is connected to the load capacitor and the electronic load through interconnections on the second package.

The first package and the second package may be separate and discrete circuit boards. Alternatively, the first package and the second package may be separate and discrete integrated circuits mounted on a common carrier (chip package or circuit board. Also, the first package and the second package may be separate functional sections within an integrated circuit. The first package is placed remotely from the second package and functionally controls the power distribution to the second package for the functional electronic circuits.

The operation of a multiple phase, multiple stage SMPC system begins with activating (Box 515) a main power source to provide power to the first package of the electronic apparatus containing the multiple phase, multiple stage SMPC system. The power applied to the first package is thus applied to the single stage phases and to the single stage phases. The load current is activated and the voltage as applied to the electronic load is regulated and the load is verified (Box 520) to be operating correctly. The load current is monitored (Box 525) to determine if it is increasing or decreasing. If the current is decreasing, an intermediate voltage from the primary stage phases is lowered such that when the transformed or divided intermediate voltage is compared to the output voltage of the secondary stage phase, the secondary stage phase is deactivated (Box 530).

In some embodiments, the secondary stage phases have an offset voltage generator that is added to the intermediate voltage for the comparison with the output voltage of the secondary stage phase. In other embodiments, the intermediate voltage itself is adjusted for the comparison for controlling the activation and deactivation of the secondary stage phases.

When the secondary stage phases are deactivated, the load current is provided (Box 535) by the single stage phases operating in a CCM mode. As the load current continues decreasing, the single stage phases are shed (Box 535), until one single stage phase is operating in the DCM mode.

If the current is determined to be increasing, the single stage phases increase the output current or in the case of the multiple single stage phases begins to add phases until all phases are activated to operate in CCM mode (Box 540). At that time the intermediate voltage of the primary stage phases is increasing. The transformed intermediate voltage is offset by an offset voltage, either as a result of the offset voltage generator in the secondary stage phase or directly being added to the intermediate voltage by the primary stage phases is compared to the output voltage of the secondary stage phase. When the comparison indicates an increase in the load current to the electronic load is increasing, the secondary stage phases are activated (Box 545) and begins regulating it output voltage dependent upon the intermediate voltage as regulated (Box 550) and filtered (Box 555) by the primary stage phases and the output filter capacitor.

The load current to the electronic load is continuously monitored (Box 525) for increasing or decreasing and the phases of the multiple phase, multiple stage switch mode power system uses the intermediate voltage to control the output voltage of the secondary stage phases and to the supply the input voltage to the secondary stage phases. The intermediate voltage is controlled so that the secondary stage phases output the correct portion of the total load current, even though the output voltage of the multiple phase, multiple stage SMPC system remains at the target voltage.

While this disclosure has been particularly shown and described with reference to the preferred embodiments thereof, it will be understood by those skilled in the art that various changes in form and details may be made without departing from the spirit and scope of the disclosure.

What is claimed is:

1. A multiple phase, multiple stage switch mode power converter (SMPC) system comprising:
  at least one single stage phase SMPC circuit configured for converting an input voltage of the multiple phase, multiple stage SMPC system to an output voltage of the multiple phase, multiple stage SMPC system and connected to an electronic load circuit for transferring the output voltage to the electronic electronic load circuit; and;
  at least one multiple stage phase SMPC circuit comprising:
    at least one primary stage phase SMPC circuit configured for converting an input voltage of the multiple phase, multiple stage SMPC system to an intermediate voltage, and
    at least one secondary stage phase of the multiple stage SMPC circuit that is connected to receive the intermediate voltage from the at least one primary stage SMPC circuit and configured for converting the intermediate voltage to an output voltage of the multiple phase, multiple stage SMPC system, wherein the at least one secondary stage of the multiple stage switch mode power supply circuit comprises:
      a voltage conditioner configured for transforming the intermediate voltage to be approximately the level of the output voltage to act a reference voltage for the secondary stage in determining the switching characteristics of the secondary stage SMPC circuit.

2. The multiple phase, multiple stage SMPC system of claim 1 wherein the at least one primary stage phase SMPC circuit is placed in close proximity to the at least one single stage multiple phase SMPC circuit.

3. The multiple phase, multiple stage SMPC system of claim 1 wherein at least one secondary stage phase of the multiple stage SMPC circuit is placed remotely to the at least one primary stage SMPC circuit and in close proximity to the electronic load circuit of the multiple phase, multiple stage SMPC system.

4. The multiple phase, multiple stage SMPC system of claim 1 wherein the at least one primary stage phase SMPC circuit and the at least one single stage phase multiple phase SMPC circuit are collocated within a first functional unit of an electronic system.

5. The multiple phase, multiple stage SMPC system of claim 1 wherein the at least one secondary stage phase SMPC circuit is located within a remote second functional unit to be in close proximity to the functional circuits of the electronic load circuit.

6. The multiple phase, multiple stage SMPC system of claim 1 further comprising a power control circuit connected directly to the at least one single stage phase SMPC circuit and the at least one primary stage phase of at least one multiple stage SMPC circuit and configured for transferring a reference level to the at least one single stage phase SMPC circuit and the at least one primary stage phase.

7. The multiple phase, multiple stage SMPC system of claim 6 wherein the reference maybe a reference voltage, a reference current, or a digital representation of the reference level.

8. The multiple phase, multiple stage SMPC system of claim 7 wherein the at least one single stage SMPC circuit and the at least one primary stage phase each comprise a digital-to-analog converter for converting the digital representation of the reference level to a reference voltage or a reference current for controlling a pulse width modulator and thus the switching timing of the a switching circuit within the at least one single stage phase SMPC circuit and the at least one primary stage phase.

9. The multiple phase, multiple stage SMPC system of claim 1 wherein the output of the at least one primary stage phase is connected to a filter for removing noise from the intermediate voltage.

10. The multiple phase, multiple stage SMPC system of claim 1 wherein the at least one secondary stage phase is configured for halting operation of a switching section of the at least one secondary stage phase when the load current approaches a zero level as indicated by the intermediate voltage.

11. The multiple phase, multiple stage SMPC system of claim 10 wherein when the at least one secondary stage phase halts switching operation as the load current approaches the zero level, the at least one single stage phase SMPC circuit is configured for providing the load current to the load.

12. The multiple phase, multiple stage SMPC system of claim 11 wherein the at least one single stage phase SMPC circuit is configured for switching operations from a continuous current mode of operation to a discontinuous mode of operation.

13. The multiple phase, multiple stage SMPC system of claim 1 wherein the at least one primary stage phase is configured for having a very large DC gain to ensure the intermediate voltage is always correct and does not droop with a sudden increase in the load current of the output of the at least one secondary stage phase.

14. The multiple phase, multiple stage SMPC system of claim 1 wherein the at least one secondary stage phase is configured for generating a small offset voltage that is added to the intermediate voltage and compared the output voltage.

15. The multiple phase, multiple stage SMPC system of claim 14 wherein when the comparison of the small offset voltage as added to the intermediate voltage and the output voltage indicates the load current is decreasing, the at least one secondary stage phase is deactivated and the at least one single stage SMPC circuit then regulates the output voltage correctly.

16. The multiple phase, multiple stage SMPC system of claim 15 wherein when the load current increases, the at least one single stage SMPC circuit provides increasingly higher the load current until the comparison indicates that the load current is increasing dramatically to a high load condition and the at least one secondary stage phase is activated.

17. The multiple phase, multiple stage SMPC system of claim 1 wherein the at least one single stage SMPC circuit comprises a first current monitor configured for sensing the output current of the at least one single stage phase SMPC circuit and for generating a sensed single stage output current signal that is transferred from the first current monitor to an input of the at least one primary stage phase stage phase.

18. The multiple phase, multiple stage SMPC system of claim 17 wherein the at least one primary stage phase comprises:
   a second current monitor configured for sensing the current at the output of the at least one primary stage to generate a sensed current signal;
   a transformation circuit in communication with an output of the second current monitor to receive the sensed current signal and configured for transforming the sensed current signal to be a transformed sensed primary stage output current signal indicating current level equivalent to approximately the output current of the at least one secondary stage phase; and
   a control circuit in communication with the first current monitor for receiving the sensed single stage output current signal, in communication with the transformation circuit for receiving the transformed sensed primary stage output current signal and configured for comparing sensed single stage output current signal and the transformed sensed primary stage output current signal for controlling the output current of the at least one secondary stage phase with respect to the output current of the at least one single stage phase SMPC circuit.

19. The multiple phase, multiple stage SMPC system of claim 18 wherein when the at least one secondary stage phase supplies too much current compared to the at least one single stage phase SMPC circuit, the at least one primary stage phase is configured for reducing the intermediate voltage for causing the at least one secondary stage phase to regulate to a slightly lower voltage for causing the at least one secondary stage phase to reduce its output current.

20. The multiple phase, multiple stage SMPC system of claim 19 wherein when the at least one secondary stage phase supplies too little current compared to the at least one single stage phase SMPC circuit, the at least one primary stage phase is configured for increasing the intermediate voltage for causing the at least one secondary stage phase to regulate to a higher voltage for causing the at least one secondary stage phase to increase its output current.

21. The multiple phase, multiple stage SMPC system of claim 20 wherein when the load current of intermediate voltage decreases to a level that indicates that the load current of the at least one secondary stage phase has reached a threshold current level that indicates that the at least one secondary stage phase must be disabled, the at least one primary stage phase is configured for decreasing the level of the intermediate voltage such that when the transformed intermediate voltage level is compared to the output voltage level, the at least one secondary stage phase is deactivated and the at least one single stage phase SMPC circuit maintains the regulation of the output voltage of the multiple phase, multiple stage SMPC system.

22. The multiple phase, multiple stage SMPC system of claim 21 wherein when the load current of intermediate voltage increases to a level that indicates that the load current of the at least one secondary stage phase has reached a threshold current level that indicates that the at least one secondary stage phase must be activated, the at least one primary stage phase is configured for increasing the level of the intermediate voltage such that when the transformed intermediate voltage level is compared to the output voltage level, the at least one secondary stage phase is activated and the at least one single stage phase SMPC circuit and the at least one secondary stage phase maintain the regulation of the output voltage of the multiple phase, multiple stage SMPC system.

23. The multiple phase, multiple stage SMPC system of claim 1 wherein the at least one primary stage phase SMPC circuit is configured for monitoring and controlling the intermediate voltage so that a load current of the at least one secondary stage phase of the multiple stage SMPC circuit is a correct portion of the total load current.

24. An electronic apparatus comprising:
   An electronic load circuit arranged upon at least one first component packages;
   a multiple phase, multiple stage SMPC system arranged upon a second component package and the at least one first component package, wherein a multiple phase, multiple stage SMPC system comprises:
      at least one single stage phase SMPC circuit arranged on the second component package and configured for converting an input voltage of the multiple phase, multiple stage SMPC system to an output voltage of the multiple phase, multiple stage SMPC system and connected to the electronic load circuit for transferring the output voltage to the electronic load circuit; and;
      at least one multiple stage phase SMPC circuit comprising:
         at least one primary stage phase SMPC circuit arranged on the second component package configured for converting an input voltage of the multiple phase, multiple stage SMPC system to an intermediate voltage, and
         at least one secondary stage phase of the multiple stage SMPC circuit that is connected to receive the intermediate voltage from the at least one primary stage SMPC circuit, arranged on the at least one first component package and configured for converting the intermediate voltage to an output voltage of the multiple phase, multiple stage SMPC system, wherein the at least one secondary stage of the multiple stage switch mode power supply circuit comprises:
            a voltage conditioner configured for transforming the intermediate voltage to be approximately the level of the output voltage to act a reference voltage for the secondary stage in determining the switching characteristics of the secondary stage SMPC circuit.

25. The electronic apparatus of claim 24 wherein the at least one primary stage phase SMPC circuit is placed in close proximity to the at least one single stage multiple phase SMPC circuit.

26. The electronic apparatus of claim 24 wherein at least one secondary stage phase of the multiple stage SMPC circuit is placed remotely to the at least one primary stage SMPC circuit and in close proximity to the electronic load circuit of the multiple phase, multiple stage SMPC system.

27. The electronic apparatus of claim 24 wherein the multiple phase, multiple stage SMPC system further comprises a power control circuit connected directly to the at least one single stage phase SMPC circuit and the at least one primary stage phase of at least one multiple stage SMPC circuit and configured for transferring a reference level to the at least one single stage phase SMPC circuit and the at least one primary stage phase.

28. The electronic apparatus of claim 27 wherein the reference maybe a reference voltage, a reference current, or a digital representation of the reference level.

29. The electronic apparatus of claim 28 wherein the at least one single stage SMPC circuit and the at least one primary stage phase each comprise a digital-to-analog converter for converting the digital representation of the reference level to a reference voltage or a reference current for controlling a pulse width modulator and thus the switching timing of a switching circuit within the at least one single stage phase SMPC circuit and the at least one primary stage phase.

30. The electronic apparatus of claim 24 wherein the output of the at least one primary stage phase is connected to a filter for removing noise from the intermediate voltage.

31. The electronic apparatus of claim 24 wherein the at least one secondary stage phase is configured for halting operation when the load current approaches a zero level as indicated by the intermediate voltage.

32. The electronic apparatus of claim 31 wherein when the at least one secondary stage phase halts switching operation as the load current approaches the zero level, the at least one single stage phase SMPC circuit is configured for providing the load current to the electronic load circuit.

33. The electronic apparatus of claim 32 wherein the at least one single stage phase SMPC circuit is configured for switching operations from a continuous current mode of operation to a discontinuous mode of operation.

34. The electronic apparatus of claim 24 wherein the primary stage phase is configured for having a very large DC gain to ensure the intermediate voltage is always correct and does not droop with a sudden increase in the load current of the output of the at least one secondary stage phase.

35. The electronic apparatus of claim 24 wherein the at least one secondary stage phase is configured for generating a small offset voltage that is added to the intermediate voltage and compared the output voltage.

36. The electronic apparatus of claim 35 wherein when the comparison of the small offset voltage as added to the intermediate voltage and the output voltage indicates the load current is decreasing, the at least one secondary stage phase is deactivated and the at least one single stage SMPC circuit then regulates the output voltage correctly.

37. The electronic apparatus of claim 36 wherein when the load current increases, the at least one single stage SMPC circuit provides increasingly higher the load current until the comparison indicates that the load current is increasing dramatically to a high load condition and the at least one secondary stage phase is activated.

38. The electronic apparatus of claim 24 wherein the at least one single stage SMPC circuit comprises a first current monitor configured for sensing the output current of the at least one single stage phase SMPC circuit and for generating a sensed single stage output current signal that is transferred from the first current monitor to an input of the at least one primary stage phase stage phase.

39. The electronic apparatus of claim 38 wherein the at least one primary stage phase comprises:
  a second current monitor configured for sensing the current at the output of the at least one primary stage to generate a sensed current signal;
  a transformation circuit in communication with an output of the second current monitor to receive the sensed current signal and configured for transforming the sensed current signal to be a transformed sensed primary stage output current signal indicating current level equivalent to approximately the output current of the at least one secondary stage phase; and
  a control circuit in communication with the first current monitor for receiving the sensed single stage output current signal, in communication with the transformation circuit for receiving the transformed sensed primary stage output current signal and configured for comparing sensed single stage output current signal and the transformed sensed primary stage output current signal for controlling the output current of the at least one secondary stage phase with respect to the output current of the at least one single stage phase SMPC circuit.

40. The electronic apparatus of claim 39 wherein when the at least one secondary stage phase supplies too much current compared to the at least one single stage phase SMPC circuit, the at least one primary stage phase is configured for reducing the intermediate voltage for causing the at least one secondary stage phase to regulate to a slightly lower voltage for causing the at least one secondary stage phase to reduce its output current.

41. The electronic apparatus of claim 40 wherein when the at least one secondary stage phase supplies too little current compared to the at least one single stage phase SMPC circuit, the at least one primary stage phase is configured for increasing the intermediate voltage for causing the at least one secondary stage phase to regulate to a higher voltage for causing the at least one secondary stage phase to increase its output current.

42. The electronic apparatus of claim 41 wherein when the load current of intermediate voltage decreases to a level that indicates that the load current of the at least one secondary stage phase has reached a threshold current level that indicates that the at least one secondary stage phase must be disabled, the at least one primary stage phase is configured for decreasing the level of the intermediate voltage such that when the transformed intermediate voltage level is compared to the output voltage level, the at least one secondary stage phase is deactivated and the at least one single stage phase SMPC circuit maintains the regulation of the output voltage of the multiple phase, multiple stage SMPC system.

43. The electronic apparatus of claim 42 wherein when the load current of intermediate voltage increases to a level that indicates that the load current of the at least one secondary stage phase has reached a threshold current level that indicates that the at least one secondary stage phase must be activated, the at least one primary stage phase is configured for increasing the level of the intermediate voltage such that when the transformed intermediate voltage level is compared to the output voltage level, the at least one secondary stage phase is activated and the at least one single stage phase SMPC circuit and the at least one secondary stage phase maintain the regulation of the output voltage of the multiple phase, multiple stage SMPC system.

44. The electronic apparatus of claim 24 wherein the at least one primary stage phase SMPC circuit is configured for monitoring and controlling the intermediate voltage so that a load current of the at least one secondary stage phase of the multiple stage SMPC circuit is a correct portion of the total load current.

45. A method for operating a multiple phase, multiple stage SMPC system comprises the steps of:

activating a main power source to provide power to a first package of an electronic apparatus containing the multiple phase, multiple stage SMPC system such that the power is applied to at least one single stage phase switch mode power circuit and to at least one primary stage phase of a multiple stage switch mode power circuit;

applying an output voltage of the at least one single stage phase switch mode power circuit to a second package of the electronic apparatus and to an electronic load circuit mounted on the second package;

activating the electronic load circuit to sink a load current;

applying an output voltage of the at least one primary stage phase switch mode power circuit to at least one secondary stage phase switch mode power circuit mounted on the second package of the electronic apparatus;

applying an output voltage of the at least one secondary stage phase switch mode power circuit to the electronic load circuit;

regulating a voltage applied to the electronic load circuit;

verifying that the electronic load circuit is operating correctly;

monitoring the load current of the electronic load circuit to determine if it is increasing or decreasing;

when monitoring the load current of the electronic load circuit indicates that the load current of the electronic load circuit is decreasing:

deactivating the at least one secondary stage phase when the monitoring indicates that a decrease in load current of the at least one secondary stage phase of the multiple stage switch mode power circuit is occurring; and when monitoring the load current of the electronic load circuit indicates that the load current is increasing:

activating the at least one secondary stage phase of the multiple stage switch mode power circuit and regulating the output voltage of the multiple phase, multiple stage SMPC system dependent upon the intermediate voltage as regulated by the at least one primary stage phase of the multiple stage switch mode power circuit, when the monitoring indicates an increase in the load current of the multiple phase, multiple stage SMPC system is occurring.

46. The method for operating a multiple phase, multiple stage SMPC system of claim 45 wherein monitoring the electronic load circuit comprises adding an offset voltage to the intermediate voltage for the comparison with the output voltage of the at least one secondary stage phase of the multiple stage switch mode power circuit for activating and deactivating the secondary stage phase of the multiple stage switch mode power circuit.

47. The method for operating a multiple phase, multiple stage SMPC system of claim 45 wherein monitoring the electronic load circuit comprises offsetting the intermediate voltage by the primary stage phase of the multiple stage switch mode power circuit for the comparison for controlling the activation and deactivation of the at least one secondary stage phase of the multiple stage switch mode power circuit.

48. The method for operating a multiple phase, multiple stage SMPC system of claim 45 wherein deactivating the at least one secondary stage phase comprises shedding each of the single stage phases of multiple single stage switch mode power converter circuit phases as the current decreases.

49. The method for operating a multiple phase, multiple stage SMPC system of claim 48 wherein when the load current of the electronic load circuit is determined to be increasing, adding one single stage phase of the multiple single stage switch mode power converter circuit phases as the load current of the electronic load circuit increases until all phases are activated.

50. The method for operating a multiple phase, multiple stage SMPC system of claim 48 wherein when the intermediate voltage of the at least one primary stage phase of the multiple stage switch mode power circuit is increasing, further comprising the steps of:

offsetting the transformed intermediate voltage by an offset voltage;

comparing the offset, transformed, intermediate voltage to the output voltage of the at least one secondary stage phase of the multiple stage switch mode power circuit;

activating the at least one secondary stage phase of the multiple stage switch mode power circuit; and regulating of the at least one secondary stage phase of the multiple stage switch mode power circuit output voltage dependent upon the intermediate voltage as regulated by the at least one primary stage phase stage phase of the multiple stage switch mode power circuit.

51. The method for operating a multiple phase, multiple stage SMPC system of claim 48 wherein offsetting the transformed intermediate voltage either comprises adding the offset voltage to the intermediate voltage by the at least one primary stage phase of the multiple stage switch mode power circuit.

* * * * *